Figure 1:
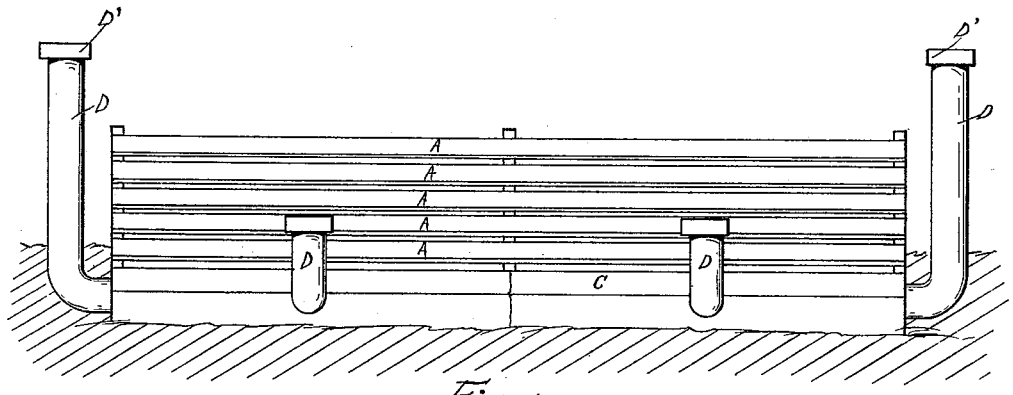

(No Model.)

C. G. BULLARD.
PRESERVATION OF CELERY.

No. 544,455. Patented Aug. 13, 1895.

WITNESSES:
Clara A. Williams.
B. E. Willard.

INVENTOR
Chandler G. Bullard.
BY
Samuel N. Oxenford.
ATTORNEY.

UNITED STATES PATENT OFFICE.

CHANDLER G. BULLARD, OF KALAMAZOO, MICHIGAN.

PRESERVATION OF CELERY.

SPECIFICATION forming part of Letters Patent No. 544,455, dated August 13, 1895.

Application filed January 16, 1895. Serial No. 535,109. (No model.)

*To all whom it may concern:*

Be it known that I, CHANDLER G. BULLARD, a citizen of the United States, residing at Kalamazoo, in the county of Kalamazoo and State of Michigan, have invented certain new and useful Improvements in the Preservation of Celery, of which the following is a specification.

Efforts have heretofore been made to preserve celery by transplanting the same in trenches excavated in the earth and hilling or banking it up with earth until the tops are nearly or quite covered. That method, however, does not preserve the celery, for the tops and leaves are almost entirely destroyed and a very large amount is lost by rotting and freezing. Efforts have also been made to preserve celery by transplanting the same in cellars and buildings constructed for that purpose, but the life of the plant is short, as it soon rots from heating, insufficient sustenance for the plants, or insufficient ventilation. Neither of these methods of preservation have been successful or proven satisfactory in a commercial sense. The method herein pointed out will obviate the difficulties that appear in the means referred to, as it assists nature in giving vitality to the plant and at the same time husbands the physiological elements of the leaves and stalks and gives protection and nourishment to the roots.

The object of my invention is to preserve celery during the winter and spring months, so that the same may be placed upon the market in a fresh and good state of preservation and retain as near as possible the normal taste and flavor of the plant.

I carry my invention into effect by the means shown by the drawings and described herein, said drawings being made a part hereof and reference thereto had, and in which like letters refer to similar parts throughout. I first construct a suitable receptacle in which I can suspend the celery, the roots preferably projecting through the receptacle and covered with earth or other suitable material, the leaves and stalks hanging downward quite freely in the receptacle. The receptacle is provided with any suitable means of ventilation and preferably with means that will enable some degree of regulation. When the celery is placed in the receptacle, the whole receptacle is preferably hilled up, the celery being taken out when desired by removing the covering. This end may be accomplished in various ways, but that preferred is shown in the drawings, wherein—

Figure 2:
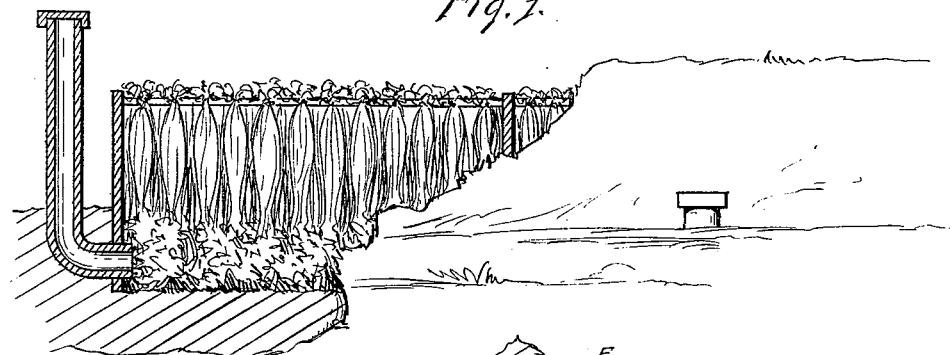
Figure 3:
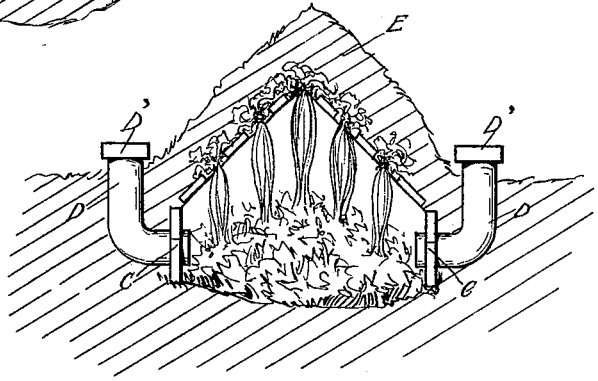

Figure 1 is a longitudinal elevational view of a section without any covering. Fig. 2 is a longitudinal view showing a portion of the section covered by earth and a portion in longitudinal section exhibiting the celery suspended together with the means of admitting air. Fig. 3 is a cross-section showing the earth covering, celery suspended, and ventilating apparatus.

Referring to the drawings, the receptacle is preferably built and constructed as follows: A trench is excavated of sufficient depth to contain the celery in position, as shown in Fig. 3. The sides of said trench are boarded up, and on the top of the boards C is constructed a suitable roof of which the boards or slats A are removable. The ends of the receptacle are protected by boards B. Leading into this receptacle are the air-pipes D, which enter the receptacle below the surface of the earth and extend a sufficient distance above it to suit the convenience of removing or placing thereon caps D'.

The celery is placed in the receptacle by being inserted from the outside in the openings between the slats A, the stalks and leaves projecting downward, the roots projecting upward, spreading out and resting upon slats A, and being supported and maintained in position by said slats A and the earth covering, earth being placed thereon after said openings are filled with celery, as shown in Figs. 2 and 3. The receptacle is then covered with earth or other suitable material E a sufficient depth to prevent the celery from freezing and to furnish sustenance to the roots and plants, as shown in Figs 2 and 3. After the celery is placed in the receptacle a sufficient amount of air may be admitted through the pipes D. Ordinarily, the caps D' may be left off, but when the weather is cold they may be placed on said pipes D to prevent the freezing of the plants. The celery is placed in said receptacle for preservation when it is sufficiently matured in the fall of the year and may be kept there in the manner described during the winter and spring months in substantially the same condition as when placed therein.

When it is desirable to remove any of the celery from the receptacle, I uncover the boards between which it is held and take it out by drawing it up through the openings between the slats, being careful to close up again any opening I may have made for that purpose unless I have removed all the celery from the receptacle.

The receptacle may be used from year to year.

The condition of the celery may be examined from time to time by removing the boards B.

There may be times when the covering of the roots fail to supply them with sufficient moisture. This can ordinarily be determined by an examination of the plants and remedied by watering the covering.

Having described my invention and pointed out the process and means of preservation, what I claim as new, and desire to secure by Letters Patent, is—

The process of preserving celery in a ventilated receptacle by suitably suspending the celery with the roots upward and protecting the roots with an earth or other suitable covering.

CHANDLER G. BULLARD.

Witnesses:
J. F. HOONEN,
E. J. ROBBINS.